United States Patent
Murakami et al.

(10) Patent No.: US 10,332,648 B2
(45) Date of Patent: Jun. 25, 2019

(54) CHARGE STRIPPING FILM FOR CHARGE STRIPPING DEVICE OF ION BEAM

(71) Applicants: Kaneka Corporation, Osaka (JP); RIKEN, Saitama (JP)

(72) Inventors: Mutsuaki Murakami, Osaka (JP); Masamitsu Tachibana, Osaka (JP); Atsushi Tatami, Osaka (JP); Hiroo Hasebe, Saitama (JP)

(73) Assignees: KANEKA CORPORATION, Osaka (JP); RIKEN, Saitama (JP)

( * ) Notice: Subject to any disclaimer, the term of this patent is extended or adjusted under 35 U.S.C. 154(b) by 0 days.

(21) Appl. No.: 15/783,231

(22) Filed: Oct. 13, 2017

(65) Prior Publication Data

US 2018/0102195 A1    Apr. 12, 2018

Related U.S. Application Data

(63) Continuation of application No. PCT/JP2016/061969, filed on Apr. 14, 2016.

(30) Foreign Application Priority Data

Apr. 15, 2015   (JP) ................................. 2015-083714

(51) Int. Cl.
*B29D 7/01* (2006.01)
*B32B 5/14* (2006.01)
(Continued)

(52) U.S. Cl.
CPC ................ *G21K 1/14* (2013.01); *B29D 7/01* (2013.01); *B32B 5/14* (2013.01); *B32B 9/007* (2013.01);
(Continued)

(58) Field of Classification Search
CPC .... G21K 1/14; B29D 7/01; B32B 5/14; B32B 9/007; B32B 9/041; B32B 15/00;
(Continued)

(56) References Cited

U.S. PATENT DOCUMENTS 6,462,348 B1    10/2002  Gelbart
2009/0301697 A1  12/2009  Hirose
(Continued)

FOREIGN PATENT DOCUMENTS

CN    104445174 A    3/2015
JP    S5523035 A     2/1980
(Continued)

OTHER PUBLICATIONS

International Search Report issued in International Application No. PCT/JP2016/061969; dated Jul. 5, 2016 (2 pages).
(Continued)

*Primary Examiner* — Nicole M Ippolito
*Assistant Examiner* — Hanway Chang
(74) *Attorney, Agent, or Firm* — Osha Liang LLP

(57) ABSTRACT

A charge stripping film for a charge stripping device of ion beam is a carbon film produced by annealing a polymer film, and has a film thickness of 10 μm to 150 μm, an area of at least 4 cm², and an atomic concentration of carbon of at least 97%. A charge stripping film for a charge stripping device of ion beam is a carbon film having a thermal conductivity in a film surface direction at 25° C. of at least 300 W/mK, and has a film thickness of 10 μm to 150 μm, an area of at least 4 cm², and an atomic concentration of carbon of at least 97%.

19 Claims, 7 Drawing Sheets

(51) Int. Cl.
| | | |
|---|---|---|
| B32B 9/00 | (2006.01) | |
| B32B 9/04 | (2006.01) | |
| G21K 1/00 | (2006.01) | |
| G21K 1/14 | (2006.01) | |
| H05H 7/00 | (2006.01) | |
| H05H 7/08 | (2006.01) | |
| B29C 71/02 | (2006.01) | |
| B32B 15/00 | (2006.01) | |
| B32B 33/00 | (2006.01) | |
| C01B 32/05 | (2017.01) | |
| H01J 27/02 | (2006.01) | |
| H05H 13/04 | (2006.01) | |

(52) U.S. Cl.
CPC .............. *B32B 9/041* (2013.01); *B32B 15/00* (2013.01); *B32B 33/00* (2013.01); *C08J 7/08* (2013.01); *H01J 27/022* (2013.01); *H05H 7/00* (2013.01); *B32B 2307/302* (2013.01); *B32B 2307/718* (2013.01); *B32B 2313/04* (2013.01); *C01B 32/05* (2017.08); *C08J 2333/24* (2013.01); *C08J 2337/00* (2013.01); *C08J 2339/00* (2013.01); *G21K 1/00* (2013.01); *H01J 2237/004* (2013.01); *H05H 7/08* (2013.01); *H05H 13/04* (2013.01); *H05H 2007/005* (2013.01); *H05H 2007/088* (2013.01)

(58) Field of Classification Search
CPC .............. B32B 33/00; B32B 2307/302; B32B 2307/718; B32B 2313/04; C08J 7/08; C08J 2333/24; C08J 2333/00; C08J 2339/00; H01J 2237/004
USPC .............................................. 250/423 R, 424
See application file for complete search history.

(56) References Cited

U.S. PATENT DOCUMENTS

| | | | |
|---|---|---|---|
| 2010/0272977 A1 | 10/2010 | Hasegawa et al. | |
| 2016/0249453 A1 | 8/2016 | Tatami et al. | |
| 2017/0267908 A1* | 9/2017 | Murakami | ............... C09K 5/14 |
| 2018/0049306 A1* | 2/2018 | Murakami | ............. B32B 9/007 |

FOREIGN PATENT DOCUMENTS

| | | |
|---|---|---|
| JP | H01159942 A | 6/1989 |
| JP | H1064699 A | 3/1998 |
| JP | 4299261 B2 | 7/2009 |
| JP | 2010195609 A | 9/2010 |
| JP | 2010257664 A | 11/2010 |
| JP | 4821011 B2 | 11/2011 |
| JP | 5309320 B2 | 10/2013 |
| WO | 2015045641 A1 | 4/2015 |

OTHER PUBLICATIONS

Hasebe et al., "Development of a new foil compounded from carbon nanotubes and sputter-deposition carbon," Journal of Radioanalytical and Nuclear Chemistry (2014), 299, pp. 1013-1018 (6 pages).

Sugai et al., "Fabrication of Isotopic and Natural Carbon Foils by Thermal Cracking Method and some Issues," 27th International Conference of the International Nuclear Target Development Society (INTDS-2014) Tokyo, Japan, Aug. 2014, Abstract (1 page).

Momozaki et al., "Proton Beam-on-Liquid Lithium Stripper Film Experiment," 27th International Conference of the International Nuclear Target Development Society (INTDS-2014) Tokyo, Japan, Aug. 2014, Abstract (1 page).

Hasebe et al., "Development of rotating beryllium disk stripper," 27th International Conference of the International Nuclear Target Development Society (INTDS-2014) Tokyo, Japan, Aug. 2014, Abstract (1 page).

Extended European Search Report issued in corresponding Application No. 16780098.6; dated Nov. 15, 2018 (8 pages).

Extended European Search Report issued in corresponding Application No. 16780102.6; dated Dec. 7, 2018 (7 pages).

International Search Report issued in International Application No. PCT/JP2016/061983; dated Jul. 5, 2016 (2 pages).

Yamazaki et al., "Analyses and the effect of impurities contained in charge stripper foils for the 3-GeV RCS of J-PARC," Journal of Radioanalytical and Nuclear Chemistry (2015) 305, pp. 859-864 (5 pages).

Office Action issued in U.S. Appl. No. 15/783,242, dated Sep. 28, 2018 (9 pages).

* cited by examiner

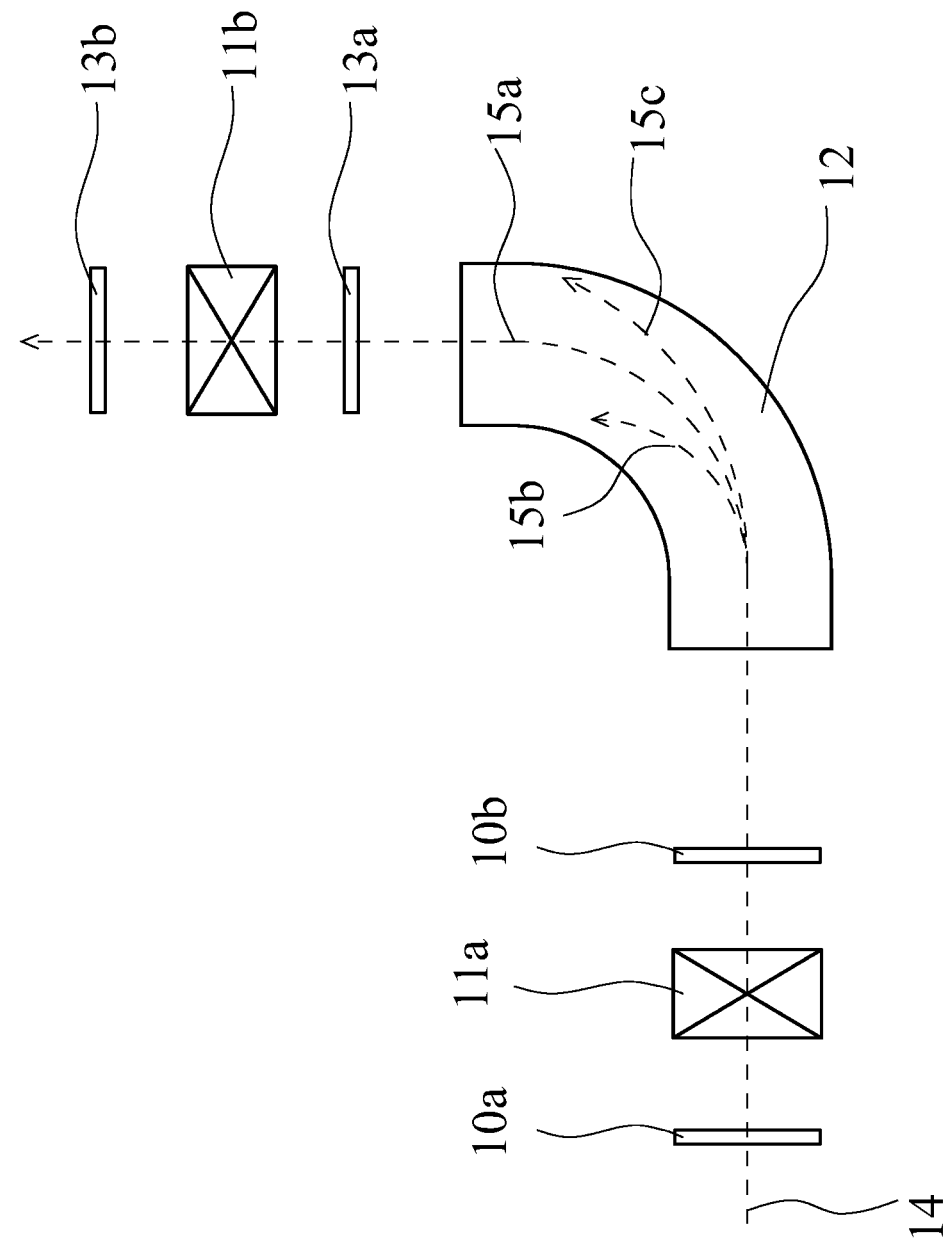
[Figure 1]

[Figure 2]
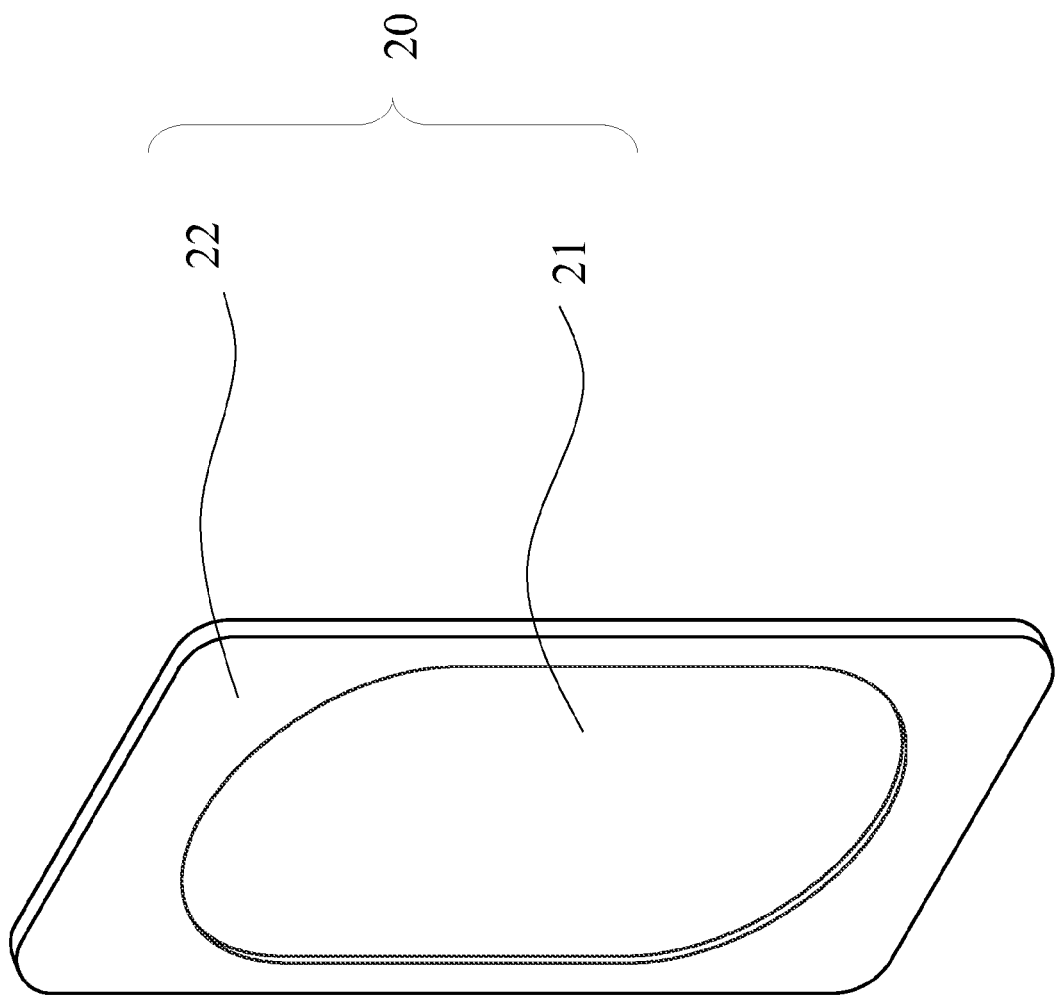

[Figure 3]
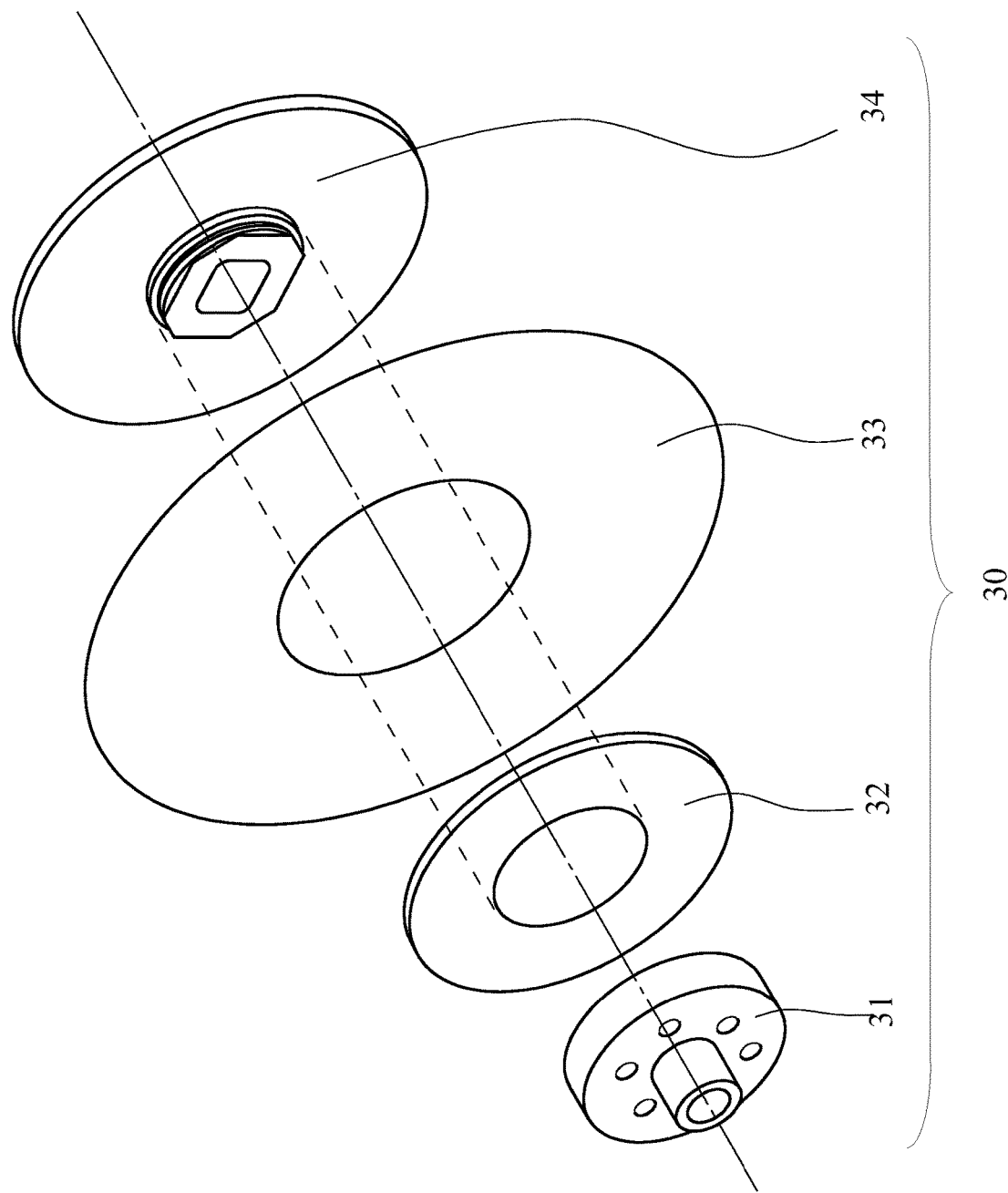

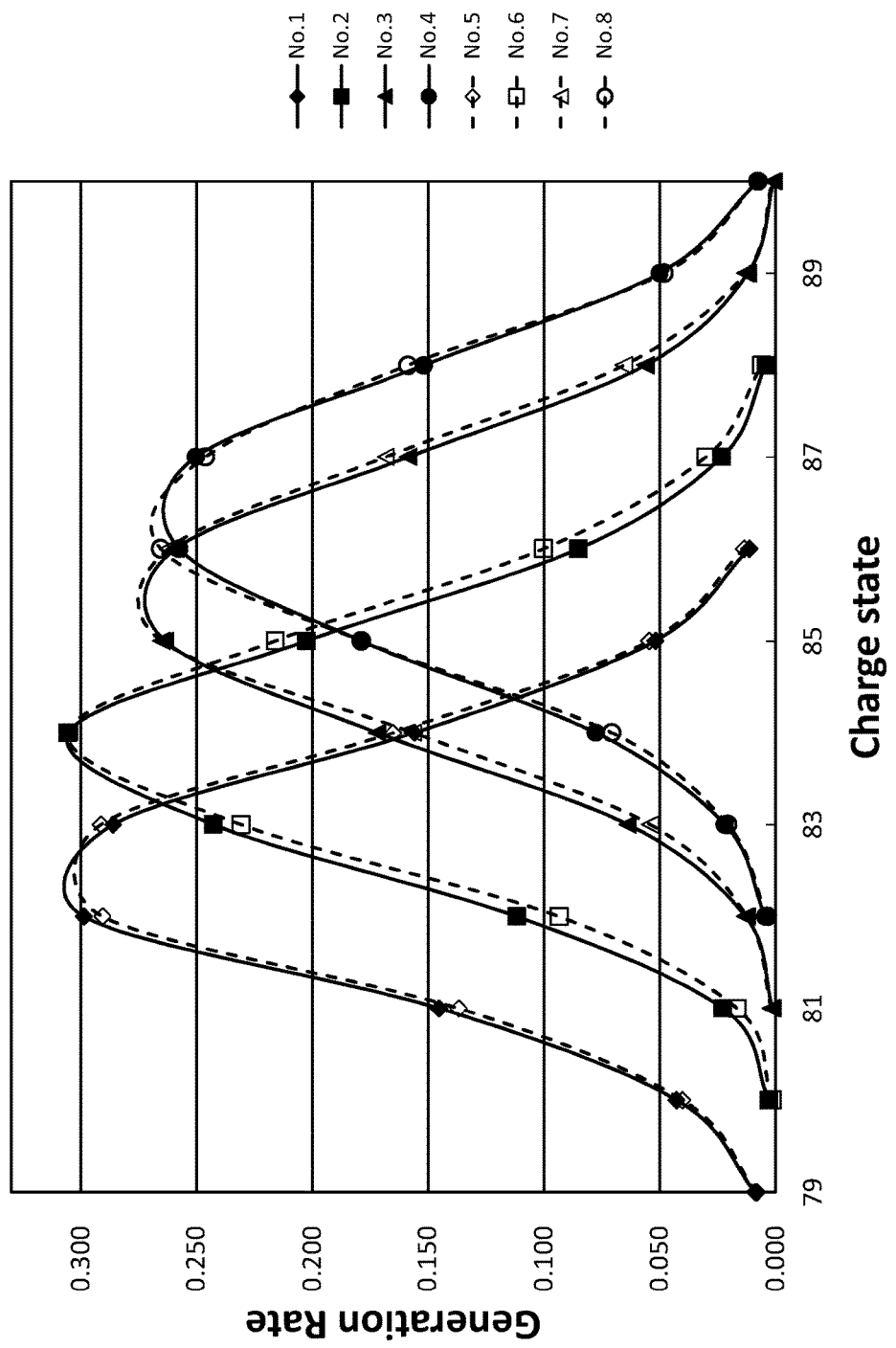
[Figure 4]

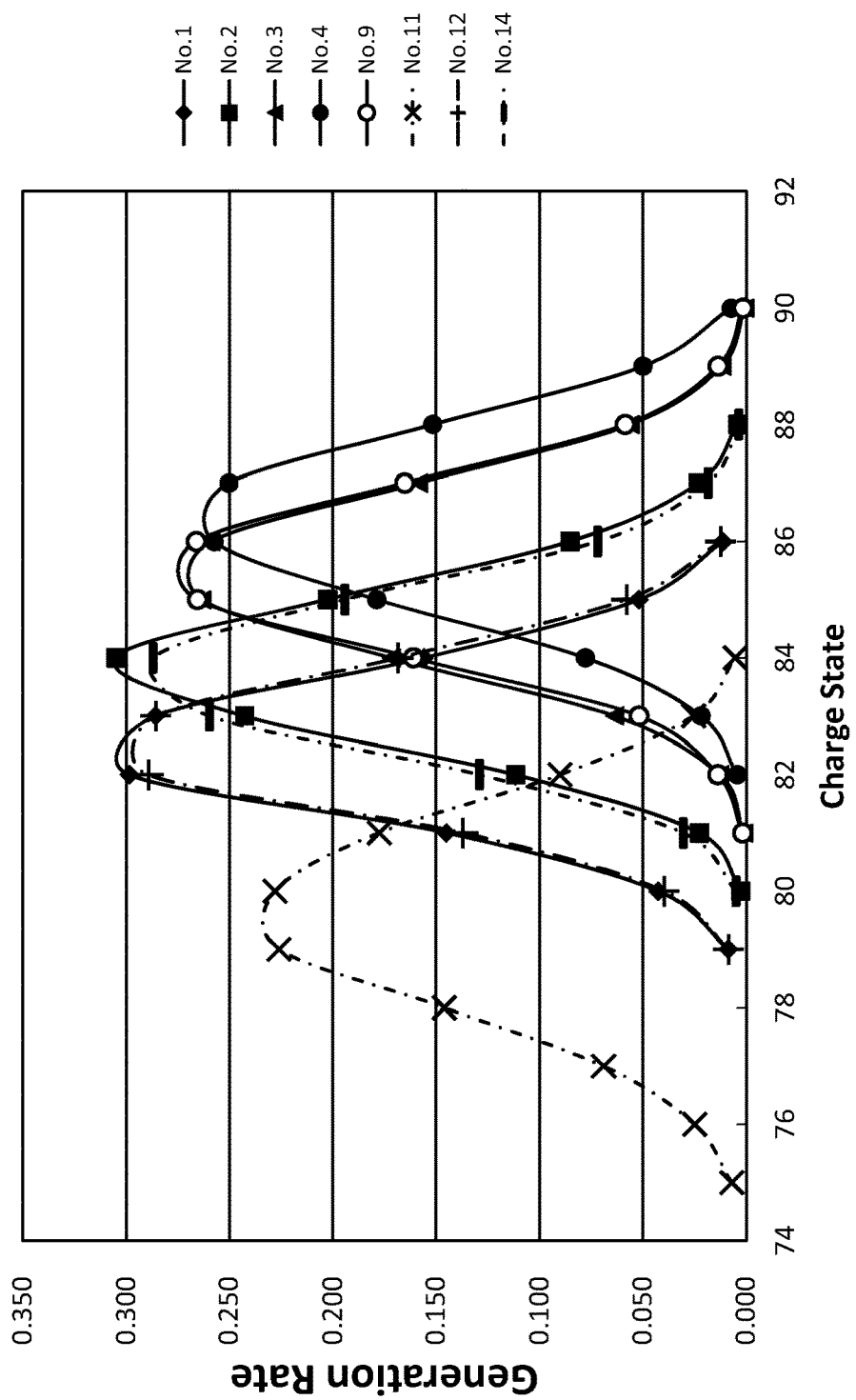
[Figure 5]

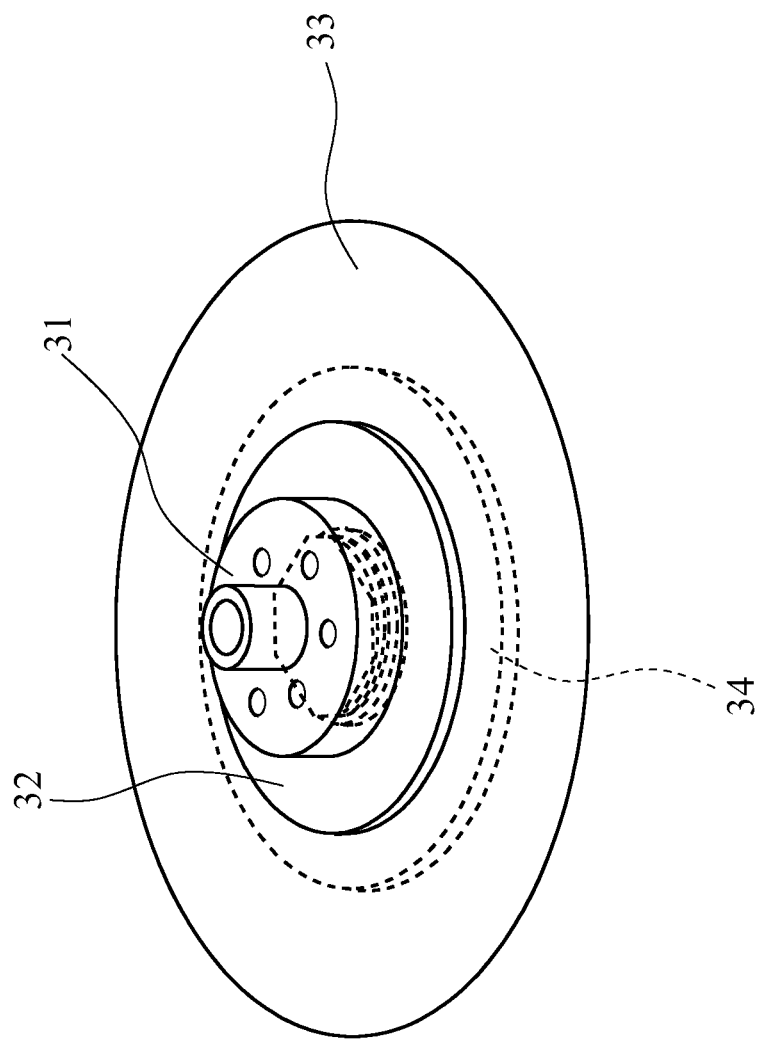
[Figure 6]

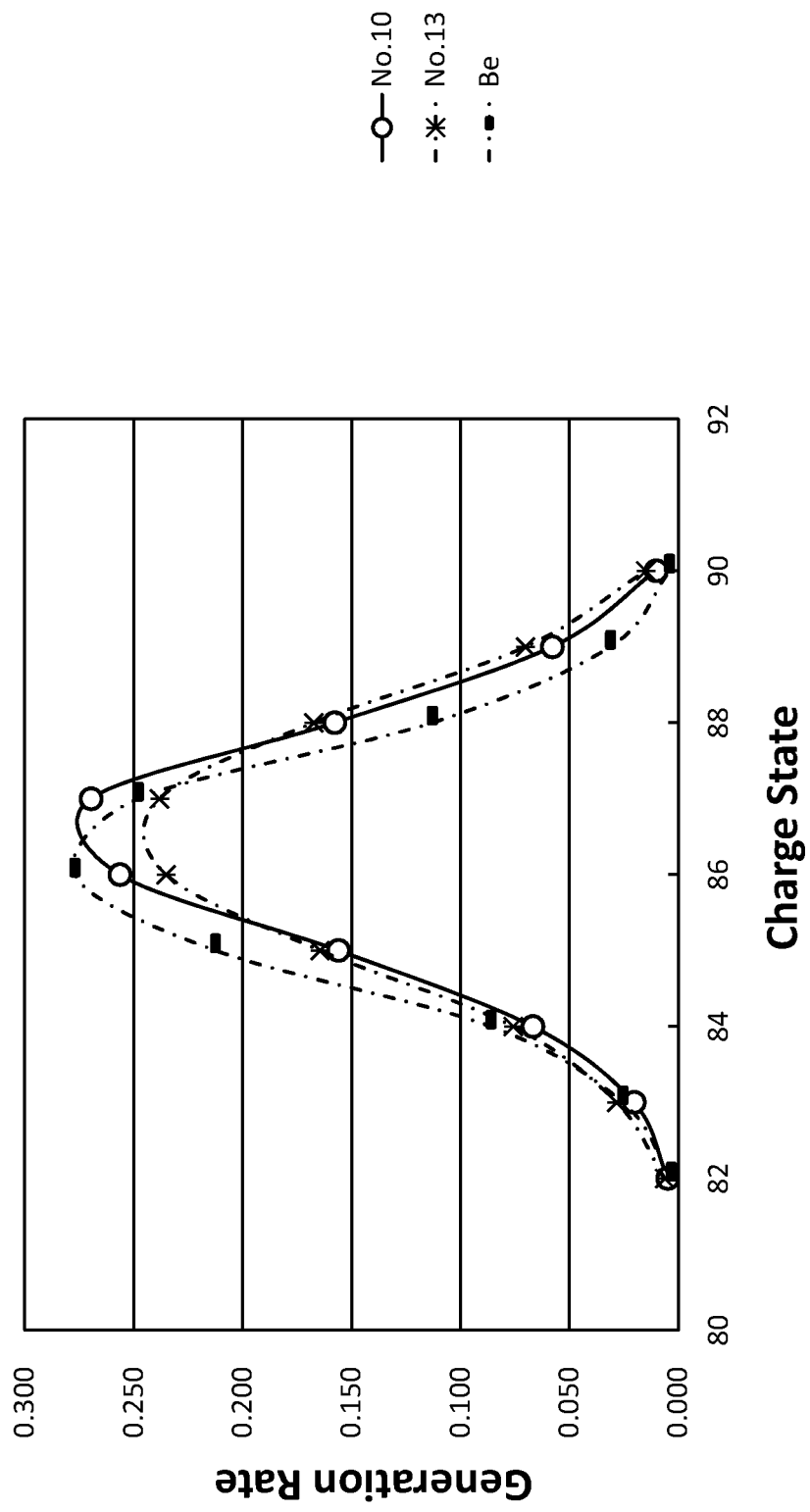
[Figure 7]

CHARGE STRIPPING FILM FOR CHARGE STRIPPING DEVICE OF ION BEAM

TECHNICAL FIELD

One or more embodiments of the present invention relate to a charge stripping film for a charge stripping device for use in an ion beam accelerator.

BACKGROUND

In order to efficiently accelerate a beam in an ion beam accelerator, it is necessary to remove electrons from ions to adjust into an intended charge state. A charge stripping film plays an important role for adjustment into an appropriate charge state by removing electrons from ions. Liquid lithium, beryllium, a carbon film, a carbon-boron composite film, a carbon nanotube composite film, and a carbon-organic composite film have been reported as charge stripping films (Non-Patent Document 1).

Since lithium reacts with water, a charge stripping film produced from liquid lithium requires a special apparatus in dry and a noble gas atmosphere, and the apparatus is very expensive and complicated (Non-Patent Document 1).

Meanwhile, beryllium has been frequently used as a target material due to its light element and high charge stripping efficiency (Non-Patent Document 1). However, beryllium is very expensive and toxic that caused to a lethal chronic disease called chronic beryllium disease when beryllium dust is absorbed into a human body.

Although vapor-deposited carbon film by arc discharge method or the like is used as a charge stripping film, the carbon film exhibits poor physical strength, low heat resistance or the like (Patent Document 1). Although a carbon-boron composite film has been reported as a method for increasing the physical strength of the carbon film, sodium impurities in the reagent during film fabrication are radio-activated by a beam irradiation (Patent Document 2).

Although a carbon nanotube (CNT) composite film (Patent Document 3) has high physical strength, the film can be damaged due to its lower heat resistance after a long-time operation. Thus, it is necessary to suspend the operation of the accelerator every time such damage occurs (Non-Patent Document 2). A carbon coated CNT film contained Iron and silicon impurities during film fabrication. For this reason, the charge stripping film after a beam irradiation is radio-activated, and several months are required for the charge stripping film to be transferable from a radiation controlled area. From these points of view, to develop a carbon-based charge stripping film for a charge stripping film with high quality and high heat resistance without radioactivation is important.

A carbon film using natural graphite is known as a carbon film with high quality and high heat resistance, (Patent Document 4). However, the carbon film is produced by press-working a powdery or scaly natural graphite as a raw material and the film strength of the carbon film is weak. Thus, the graphite fragments can be scattered inside the casing when the carbon film is damaged. In addition, the film thickness control is difficult, and hard to produce different thickness of thin graphite film, and the film has low density and rough variation in the film thickness.

When the carbon film is used as a charge stripping film for an ion beam, desired ranges of carbon film density and film thickness are predetermined depending on the charge state of the original beam and the desired beam, and the kind of the beam. The thickness of the film influences on the charge distribution and the charge efficiency of the beam (Non-Patent Document 1). Therefore, various thickness charge stripping films with sufficient heat resistance and strength for an ion beam charge stripping device have been demanded to meet the requirements of beam lines.

PATENT DOCUMENTS

[Patent Document 1] JPB1342226
[Patent Document 2] JPB5309320
[Patent Document 3] JPB4821011
[Patent Document 4] JPB4299261

NON PATENT DOCUMENTS

[Non Patent Document 1] 27th International Conference of the International Nuclear Target Development Society (INTDS-2014) Tokyo, Japan, August, 2014.
[Non Patent Document 2] Hasebe H. et al Journal of Radioanalytical and Nuclear Chemistry, 2014, 299, 1013-1018.

SUMMARY

One or more embodiments of the present invention provide a high-quality charge stripping film for a charge stripping device of ion beam, that has high heat resistance and high thermal conductivity, and that has high density and high quality to the degree of withstanding a beam irradiation over a long period of time.

One or more embodiments of the present invention are directed to a charge stripping film (1) for a charge stripping device of ion beam, wherein the charge stripping film is a carbon film produced by a polymer annealing method, and has a film thickness of not less than 10 μm and not more than 150 μm. One or more embodiments of the present invention are directed to a charge stripping film (2) for a charge stripping device of ion beam, wherein the charge stripping film is a carbon film having a thermal conductivity in a film surface direction at 25° C. of not less than 300 W/mK, and has a film thickness of not less than 10 μm and not more than 150 μm.

One or more embodiments of the present invention include the charge stripping film (3) for a charge stripping device of ion beam according to (1) or (2), having a density of not less than 0.90 g/cm$^3$ and not more than 2.26 g/cm$^3$.

One or more embodiments of the present invention include the charge stripping film (4) for a charge stripping device of ion beam according to any one of (1) to (3), having a weight per unit area of not less than 1.5 mg/cm$^2$ and not more than 30 mg/cm$^2$.

One or more embodiments of the present invention include the charge stripping film (5) for a charge stripping device of ion beam according to any one of (1) to (4), having an area of not less than 4 cm$^2$.

One or more embodiments of the present invention include the charge stripping film (6) for a charge stripping device of ion beam according to any one of (1), (3) to (5), having a thermal conductivity in a film surface direction at 25° C. of not less than 20 W/mK.

One or more embodiments of the present invention include the charge stripping film (7) for a charge stripping device of ion beam according to any one of (1) to (6), having an atomic concentration of carbon of not less than 97%.

One or more embodiments of the present invention also include the charge stripping film (8) for a charge stripping device of ion beam according to any one of (1) to (7), obtained by heat-treating a polymer film at not less than 2400° C. in an inert gas atmosphere. (9) The polymer film may be at least one selected from polyamide, polyimide, polyquinoxaline, polyparaphenylene vinylene, polyoxadiazole, polybenzimidazole, polybenzoxazole, polybenzothiazole, polyquinazolinedione, polybenzoxazinone, polyquinazolone, benzimidazobenzophenanthroline ladder polymer, and derivatives thereof. (10) The polymer film may be aromatic polyimide.

(11) The aromatic polyimide in (10) may be polyimide obtained by using either or both of pyromellitic anhydride, and 3,3',4,4'-biphenyltetracarboxylic dianhydride as a raw material. (12) Also, the aromatic polyimide in (10) or (11) may be polyimide obtained by using either or both of 4,4'-diaminodiphenylether, and p-phenylenediamine as a raw material.

One or more embodiments of the present invention include a charge stripping laminate film (13) for a charge stripping device of ion beam, comprising a laminate of a plurality of charge stripping films according to any one of (1) to (12). One or more embodiments of the present invention also include a charge stripping laminate film (14) for a charge stripping device of ion beam, comprising a laminate of the charge stripping film according to any one of (1) to (12), and a charge stripping film produced by a method other than a polymer annealing method.

One or more embodiments of the present invention also include a charge stripping laminate film (15) for a charge stripping device of ion beam, comprising a laminate of at least one layer of metal and metal oxide, and the charge stripping film according to any one of (1) to (12). (16) In the charge stripping laminate film (15), graphite layer having different orientation may be further laminated.

Further, one or more embodiments of the present invention also include a process (17) for producing a charge stripping film for a charge stripping device of ion beam, the method being a method for producing the charge stripping film according to any one of (1) to (12), wherein a polymer film is heated at not less than 2400° C. in an inert gas atmosphere.

According to a charge stripping film for a charge stripping device of ion beam of one or more embodiments of the present invention, produced by a polymer annealing method, the stripping efficiency of charge state is higher than that by other kinds of charge conversion film having the same weight per unit area. Therefore, the thin charge stripping film enables to obtain the same charge state with excellent heat resistance, and improving the durability against a beam irradiation. The charge stripping film with a thermal conductivity in the film surface direction at 25° C. of not less than 45 W/mK, particularly produced by a polymer annealing method at a heating temperature of not less than predetermined temperature is a charge stripping film having a thermal conductivity in the film surface direction at 25° C. of not less than 300 W/mK, and can withstand irradiation with high intensity beam over a long period of time. From this point of view, the film has excellent heat conductive characteristics. Further, the film has high atomic concentration of carbon, there is no fear of outgassing under high vacuum and high temperature without radioactivation by a beam irradiation, and the film has excellent chemical stability. The charge stripping film as described herein has higher physical strength compared with other kinds of charge stripping films, that makes the film work or handle easily. Thus, the charge stripping film as described herein may be an optimum material as a charge stripping film for a charge stripping device of ion beam, and could be applied to many applications.

BRIEF DESCRIPTION OF THE DRAWINGS

FIG. 1 is a schematic view of a charge stripping device of uranium beam.

FIG. 2 is a schematic perspective view of a stationary type charge stripping film fabricated by using a charge stripping film for a charge stripping device of ion beam according to one or more embodiments of the present invention.

FIG. 3 is a schematic perspective exploded view of a disc-shaped rotary type charge stripping film fabricated by using a charge stripping film for a charge stripping device of ion beam according to one or more embodiments of the present invention.

FIG. 4 is a graph showing charge state distributions of uranium beams after passing through the stationary type charge stripping films fabricated by using the charge stripping films for a charge stripping device of ion beam according to one or more embodiments of the present invention.

FIG. 5 is a graph showing charge state distributions of uranium beams after passing through the stationary type charge stripping films fabricated by using the charge stripping films for a charge stripping device of ion beam according to one or more embodiments of the present invention, and other various charge stripping films.

FIG. 6 is a schematic perspective view of a disc-shaped rotary type charge stripping film fabricated by using a charge stripping film for a charge stripping device of ion beam according to one or more embodiments of the present invention.

FIG. 7 shows charge state distributions of uranium ion beams after passing through the disc-shaped rotary type charge stripping films fabricated by using a charge stripping film for a charge stripping device of ion beam according to one or more embodiments of the present invention (No. 10), a charge stripping film of Comparative Example 3 (No. 13), and beryllium.

DETAILED DESCRIPTION OF THE EMBODIMENTS

The inventors of the present disclosure found that when a charge stripping film for an ion beam charge stripping device is produced by a polymer annealing method, namely by heat treatment of a polymer film, an ion beam having passed through the charge stripping film for a charge stripping device of ion beam shows sharp distribution of charge state. That is, in one or more embodiments of the present invention, the charge stripping film for a charge stripping device of ion beam is capable of stably removing electrons from an incident ion beam, and obtaining ions of a desired charge state with a high generation rate. In one or more embodiments of the present invention, the carbon film is not damaged even by irradiation with a beam of high intensity over a long period of time, and is excellent in durability and has little fear of radioactivation. Further, in one or more embodiments of the present invention, a charge stripping laminate film for a charge stripping device of ion beam is advantageous in that it has higher physical strength and easier to work or handle compared with a charge stripping film for a charge stripping device that is obtained by other production process such as vapor deposition.

In one or more embodiments of present invention, the charge stripping film for a charge stripping device of ion beam has a film thickness of not less than 10 µm and not more than 150 µm. While the charge state of the ion beam after passing through the charge stripping film can be controlled by adjusting the film thickness of the charge stripping film, regarding the charge stripping film of one or more embodiments of the present invention produced by the polymer annealing method, the thickness of the obtainable charge stripping film can be controlled by varying the thickness of the polymer film as a raw material, and thus various thicknesses ranging from 10 to 150 µm can be easily realized. In one or more embodiments of the present invention, it may be easy to control the ion charge number by controlling the total thickness by using a laminate of a plurality of charge stripping films (carbon films) having different thicknesses. While it is necessary to adjust the film thickness by grinding, milling or the like in the case of using an ordinary graphite plate, use of one or more embodiments of the present invention may greatly reduce such a process.

By making the film thickness of the charge stripping film not more than 150 µm, it is possible to realize excellent thermal conductivity. This is attributed by the following causes. In carbon film production by the polymer annealing method, it is considered that graphitization reaction starts from the outermost layer of the polymer carbonized film, and the graphite structure grows toward inside the film. As the film thickness of the carbon film increases, the graphite structure becomes more disordered and a cavity or a defect is more likely to arise toward inside the carbon film at the time of graphitization. Contrarily, as the film thickness decreases, the graphitization proceeds to inside in the condition that the graphite layer structure of the film surface is well-ordered, resulting that a graphite structure that is well-ordered all over the film is likely to be formed. Thus, it is supposed that when the film thickness of the charge stripping film is not more than 150 µm, the graphite layer structure is well-ordered, and thus the charge stripping film showing high thermal conductivity is obtained.

The film thickness of the charge stripping film may be not less than 20 µm, or not less than 40 µm. An upper limit of the film thickness may be not more than 130 µm, or not more than 110 µm.

The density of the charge stripping film of one or more embodiments of the present invention may be not less than 0.90 g/cm$^3$. When a defect or a cavity enters inside the carbon film, the density decreases and the thermal conductivity tends to decrease. It is considered that heat is likely to be trapped in the cavity part, and the carbon film having low density is susceptible to deterioration by the heat. Thus, the density of the charge stripping film may be large, or not less than 1.5 g/cm$^3$, or not less than 2.0 g/cm$^3$, or not less than 2.1 g/cm$^3$. An upper limit of the density is not more than 2.26 g/cm$^3$, and may be not more than 2.20 g/cm$^3$.

The weight per unit area of the carbon film as described herein may be not less than 1.5 mg/cm$^2$ and not more than 30 mg/cm$^2$. For converting the high intensity beam to have an intended charge state, it is necessary that the weight per unit area of the carbon film is not less than a predetermined value. When the carbon film having a weight outside this weight range is used, a bias occurs in the distribution of the beam charge state, and sharp distribution is not obtained. From these facts, the weight per unit area may be not less than 1.5 mg/cm$^2$, or not less than 1.8 mg/cm$^2$, or not less than 2.0 mg/cm$^2$. An upper limit of the weight per unit area may be not more than 30 mg/cm$^2$, or not more than 25 mg/cm$^2$.

In one or more embodiments of the present embodiments, the thermal conductivity in the film surface direction at a temperature of 25° C. of the charge stripping film may be not less than 20 W/mK, or not less than 30 W/mK, or not less than 45 W/mK, or not less than 60 W/mK. From the view point that the film can withstand irradiation by a high intensity beam for a long period of time as the thermal diffusivity increases, the thermal conductivity may be not less than 100 W/mK, or not less than 300 W/mK, or not less than 1000 W/mK, or not less than 1500 W/mK. The thermal conductivity may be, for example, not more than 2500 W/mK, or may be not more than 2300 W/mK.

In particular, the charge stripping film produced by the polymer annealing method at a heating temperature of not less than a predetermined temperature (for example, not less than 2500° C.) is a charge stripping film having a thermal conductivity in the film surface direction at 25° C. of not less than 300 W/mK. The charge stripping film produced at higher temperature as the heating temperature of the polymer annealing method is a charge stripping film having higher thermal conductivity (for example, at a heating temperature of not less than 2600° C., for example, not less than 1000 W/mK, or it may be not less than 1500 W/mK).

In one or more embodiments of the present invention, the atomic concentration of carbon of the charge stripping film is normally not less than 97%, and from the view point that radioactivation by irradiation with a high intensity beam for a long period of time can be prevented as the purity increases, the atomic concentration of carbon may be not less than 98%, or not less than 99%. In particular, metallic impurities such as aluminum, iron, sodium, potassium, cobalt, titanium, and nickel that can be a cause of radioactivation are desirably under the detection limit. According to one or more embodiments of the present invention, a polymer film may be used as a raw material of the charge stripping film. In such embodiments, a reagent containing metal is not used, and the material is fired at not less than 2000° C. Therefore, the feature of insusceptibility to entry of impurities other than carbon is achieved.

The charge stripping film as described herein may be used as a stationary type, or as a movable type such as a rotary type (for example, the system of rotating a disc-shaped carbon film) as described later, and in any case, the area of the charge stripping film (carbon film) may be not less than 4 cm$^2$. From the view point that the larger the area is, the more the thermal diffusivity improves and the charge stripping film can withstand the high intensity beam over a long period of time, the area of the charge stripping film may be not less than 9 cm$^2$, or not less than 16 cm$^2$, or not less than 25 cm$^2$. The larger the area is, the more the heat-release property improves, and the effect of releasing heat from the high intensity beam is high. Contrarily, when an area is too small, it may be difficult to fix the film to a jig or a heat sink, and the efficiency of heat release may be impaired. In particular, in the case of the movable type wherein the site to which the beam is irradiated is variable by moving the charge stripping film, a larger area (for example, a larger diameter in the case of a rotary disc shape) is advantageous in terms of the durability because the time during which the beam is irradiated to one site can be further reduced. While an upper limit of the area of the charge stripping film as described herein is not particularly limited, it is normally about 2500 cm$^2$.

The charge state of the ion beam after passing through the charge stripping film can be adjusted by varying the thickness of the charge stripping film, and it is very important to adjust the thickness of the charge stripping film depending on the kind and the intensity of the beam in use, and the conversion efficiency into the intended charge state. In one or more embodiments of the present invention, the charge stripping film (carbon film) as described herein may be adjusted to have an intended thickness. In such embodiments, the charge stripping film may be used alone. It is also envisioned that at least two charge stripping films as described herein may be stacked to adjust into an intended thickness. When not less than two charge stripping films are stacked, the charge stripping films may be closely adhered (laminate film), or may be arranged one by one independently at an interval in the travel direction of the ion beam. In the case of arranging the charge stripping films one by one independently, if the interval is too small, heat is likely to be trapped between the charge stripping films at the time of irradiation with a beam, and the possibility of damage arises. Therefore, at least two charge stripping films as described herein may be used as a laminate film. As shown in the below-described examples, it was found that a laminated charge stripping film made by laminating a plurality of charge stripping films as descried herein may sufficiently function as a charge stripping film. By using one or more embodiments of the present invention, it may be possible to easily fabricate films of various thicknesses that are suited for desired beam charge state only by changing the combination of the charge stripping films having different thicknesses.

In one or more embodiments of the present invention, it may be possible to laminate a different kind of charge stripping film on the present carbon film. In particular, for finely controlling the ion charge state of the beam, it may be possible to finely control the thickness of the charge stripping film. In such a case, the thickness can be finely controlled by producing a carbon film of different kind on the charge stripping film as described herein, by using methods other than the polymer annealing method such as vapor deposition, sputtering or spin coating. The carbon film produced by using a method other than the polymer annealing method is normally a carbon film having a thermal conductivity in the film surface direction at 25° C. of less than 1000 W/mK (particularly, less than 300 W/mK). Since the carbon film as described herein is excellent in physical strength, even if such a composite carbon film is produced in such a condition, the resultant film may be used as a charge stripping film.

Also, in one or more embodiments of the present invention the charge stripping film may be laminated. In such embodiments, at least one layer of metal or metal oxide may form a laminate film for a charge stripping film. Laminating with metal or metal oxide may be performed from the view point of improving the adhesion with a target material to which direct adhesion of the carbon film is difficult. It is also envisioned to further laminate a graphite layer having different orientation on the charge stripping film. In such embodiments, a fine adjustment to an intended film thickness may be easily achieved by laminating a carbon film by various methods including sputtering and vapor deposition.

In one or more embodiments of the present invention, the carbon structure that may be used in the charge stripping film as described herein may have any orientation selected from plane orientation, axial orientation (coaxial tubular, radial), point orientation (concentric sphere, radial), and non-orientation, and may have a mixture of not less than two of these. From the view point of high thermal conductivity, plane orientation may be used as well.

Since the charge stripping film as described herein has high thermal conductivity and shows excellent heat-release property, it can conduct charge stripping satisfactorily without being damaged even in a particular case where a high intensity beam of a heavy atom ion or the like is irradiated. Thus, the charge stripping film as described herein can be suitably used as a film for charge stripping of a heavy atom ion beam of, for example, uranium, xenon, krypton, zinc, iron, argon, calcium, magnesium, sodium, neon, oxygen, or carbon. The charge stripping film as described herein may be used as a charge stripping film for use not only in a large-size accelerator, but also in a medical accelerator such as an accelerator for cancer therapy and in a relatively small-size accelerator for industrial use or the like.

<Substrate Material Made from Carbon Film for Use Under High Vacuum>

The charge stripping film as described herein can be used under high vacuum (not more than $10^{-4}$ Pa, for example, about not more than $10^{-6}$ to $10^{-7}$ Pa), and the charge stripping film of one or more embodiments of the present invention itself can be used as a charge stripping film, and the charge stripping film as described herein may be laminated with other material and used as a substrate material made from carbon film for use under high vacuum. The charge stripping film contains little impurities other than graphite and has high purity because it has been already graphitized at not less than 2400° C. Therefore, outgassing does not occur even under high vacuum or even by local heating. Further, the charge stripping film as described herein is chemically stable, and can be used in applications other than under a high vacuum atmosphere. As an atmosphere other than the high vacuum atmosphere, for example, nitrogen, argon, neon, helium, hydrogen or the like can be included.

FIG. 1 is a schematic view of one example of a charge convertor of ion beam. The charge convertor of ion beam illustrated by FIG. 1 includes charge stripping films 10a, 10b for removing electrons from an incident ion beam, electromagnets 11a, 11b for converging beam, a bending magnet 12 for bending the beam track, and beam profile detectors 13a, 13b. Either one or both of the charge stripping films 10a and 10b can be provided, and provided that the side where an incident ion beam 14 enters is defined as an upstream side, for example, the charge stripping film 10a on the upstream side can be a stationary type charge stripping film, and 10b on the downstream side can be a rotary type charge stripping film. The electromagnets for converging beam can be arranged on the upstream side of the charge stripping film, and can be arranged particularly on the upstream side of the charge stripping film 10b. The ion beam incident from the upstream side of the device (for example, $U^{64+}$ etc.) 14 is converged by an electromagnet for converging beam as is necessary, and passes through the charge stripping film 10a and/or 10b, and the track of the ion beam is bent by the bending magnet 12. By preliminarily setting a current at a predetermined value, only ions 15a having a specific charge state pass through the bending magnet 12, and beams 15b, 15c having other valances collide with a wall surface of a vacuum box of the bending magnet 12 and disappear. On the downstream side of the bending magnet 12, the electromagnet 11b for converging beam can be arranged, and the beam passing through the electromagnet 11b for converging beam is then further accelerated by a ring cyclotron (not illustrated). The beam profile and the distribution of charge state of ion can be detected by the beam profile detector 13a between the bending magnet 12 and the electromagnet 11b for converging beam, or by the beam profile detector 13b on the downstream side of the electromagnet 11b for converging beam.

FIG. 2 is a schematic perspective view showing one example of a stationary type charge stripping film 20. The stationary type charge stripping film 20 is fabricated by fixing a charge stripping film 21 to a holder for stationary type charge stripping film 22 having a center hole so that the charge stripping film 21 is exposed. Examples of the material of the holder are not particularly limited, and include metals such as copper, aluminum, stainless. Examples of the shape of the exposed part of the charge stripping film 21 are not particularly limited, and include a circular shape, an elliptic shape, a rectangular shape, and a race track shape of an athletic field.

FIG. 3 is a schematic perspective view showing one example of a rotary type charge stripping film 30 made up of a charge stripping film and a holder thereof. The rotary type charge stripping film 30 includes a substrate 31 for fixing charge stripping film, a substrate 32 for supporting charge stripping film, a charge stripping film 33, and a substrate 34 for fixing charge stripping film laminated on the back surface of the charge stripping film 33. The generated beam passes through the charge stripping film 33 where electrons of the beam are taken away and the charge state increases, and then fed to the downstream accelerator. As the material for the substrates 31, 34 for fixing charge stripping film and the substrate 32 for supporting charge stripping film, for example, aluminum, copper, stainless and the like metal can be recited.

In the illustrated example, while the rotary type charge stripping film 30 is fixed in the center by using the circular substrate 31 for fixing charge stripping film, the substrate 32 for supporting charge stripping film, and the substrate 34 for fixing charge stripping film, the structure of rotating the charge stripping film 33 by using bearing, or by the method of directly connecting to a motor is also possible. The shapes of the charge substrate 31 for fixing charge stripping film, the substrate 32 for supporting charge stripping film and the substrate 34 for fixing charge stripping film are not particularly limited as long as these members can be joined with each other.

In the illustrated example, only one charge stripping film 33 (single layer) is illustrated, the number of sheets of the charge stripping film 33 and the charge stripping film 21 of the stationary type charge stripping film 20 are not particularly limited. The carbon films as described herein may be laminated, and the carbon film of one or more embodiments of the present invention, and a carbon film produced by the method other than the polymer annealing method may be laminated. Also at least one layer of metal and metal oxide may be laminated on the carbon film as described herein, and further a graphite layer having different orientation may be laminated. The total thickness of the charge stripping film may be controlled by a method of adjusting the number of carbon films depending on the kind of the beam in use and the desired charge.

In any of the stationary type and the rotary type, the charge stripping film may be flattened by pressing or the like, and further, a plurality of charge stripping films may be laminated, and the charge stripping films may be closely adhered to each other with the use of normal temperature pressing, heat pressing, ultra-high temperature heat pressing or the like. A plurality of charge stripping films may be arranged at intervals in the travel direction of the beam.

In any of the stationary type and the rotary type, coal pitch, a polymer material or the like may be applied on the charge stripping film, and the resultant charge stripping film may be laminated with a plurality of charge stripping films, and cold-pressed or hot-pressed, and graphitized under heating by using ultra-high temperature treatment or ultra-high temperature hot pressing, and thus the charge stripping films may be closely adhered to each other.

Next, a method for producing the charge stripping film as described herein will be described. For obtaining the charge stripping film as described herein, it is important to use a predetermined polymer raw material, and to heat at not less than 2400° C. in an inert gas atmosphere. Each requirement of the production process will be specifically described below.

<Polymer Raw Material>

The polymer raw material that may be used in production of a charge stripping film of one or more embodiments of the present invention is an aromatic polymer, and the aromatic polymer may be at least one selected from the group consisting of polyamide, polyimide, polyquinoxaline, polyparaphenylene vinylene, polyoxadiazole, polybenzimidazole, polybenzoxazole, polybenzothiazole, polyquinazolinedione, polybenzoxazinone, polyquinazolone, benzimidazobenzophenanthroline ladder polymer, and derivatives thereof. The film formed of such a polymer raw material can be produced by a known production process. Examples of the polymer raw material may include aromatic polyimide, polyparaphenylene vinylene, and polyparaphenylene oxadiazole. In one or more embodiments of the present invention, the aromatic polyimide that is produced from acid dianhydride (particularly, aromatic acid dianhydride) and diamine (particularly, aromatic diamine) described below via polyamic acid may be used as a polymer raw material for producing a charge stripping film as described herein.

Examples of the acid dianhydride used in synthesis of the aromatic polyimide include pyromellitic anhydride, 2,3,6,7-naphthalenetetracarboxylic dianhydride, 3,3',4,4'-biphenyltetracarboxylic dianhydride, 1,2,5,6-naphthalenetetracarboxylic dianhydride, 2,2',3,3'-biphenyltetracarboxylic dianhydride, 3,3',4,4'-benzophenone tetracarboxylic dianhydride, 2,2-bis(3,4-dicarboxyphenyl)propane dianhydride, 3,4,9,10-perylene tetracarboxylic dianhydride, bis(3,4-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)ethane dianhydride, oxydiphthalic dianhydride, bis(3,4-dicarboxyphenyl)sulfone dianhydride, p-phenylene bis(trimellitic monoester acid anhydride), ethylene bis(trimellitic monoester acid anhydride), bisphenol A bis(trimellitic monoester acid anhydride), and analogues thereof, and these can be used solely or a mixture of any desired ratio. In particular, for the reason that the polyimide film having a polymer architecture having a very rigid structure has higher orientation, and from the view point of the availability, pyromellitic anhydride, and 3,3',4,4'-biphenyltetracarboxylic dianhydride may be used.

Examples of the diamine used in synthesis of the aromatic polyimide include 4,4'-diaminodiphenylether, p-phenylenediamine, 4,4'-diaminodiphenylpropane, 4,4'-diaminodiphenylmethane, benzidine, 3,3'-dichlorobenzidine, 4,4'-diaminodiphenylsulfide, 3,3'-diaminodiphenylsulfone, 4,4'-diaminodiphenylsulfone, 4,4'-diaminodiphenylether, 3,3'-diaminodiphenylether, 3,4'-diaminodiphenylether, 1,5-diaminonaphthalene, 4,4'-diaminodiphenyldiethylsilane, 4,4'-diaminodiphenylsilane, 4,4'-diaminodiphenylethylphosphine oxide, 4,4'-diaminodiphenyl N-methylamine, 4,4'-diaminodiphenyl N-phenylamine, 1,4-diaminobenzene (p-phenylenediamine), 1,3-diaminobenzene, 1,2-diaminobenzene and analogues thereof, and these can be used solely or a mixture of any desired ratio. Further, from the view point of improving the orientation of the polyimide film, and the availability, the aromatic polyimide may be synthesized by using 4,4'-diaminodiphenylether, or p-phenylenediamine as a raw material.

<Synthesis of Polymer Raw Material, Film Formation>

A method for producing polyimide as a polymer raw material will be described below. As a method for producing polyimide, a heat curing method in which a polyamic acid as a precursor is converted into imide by heating, and a chemical curing method in which a polyamic acid is converted into imide by using a dehydrating agent typified by acid anhydride such as acetic anhydride, or tertiary amines such as picoline, quinoline, isoquinoline, and pyridine as an imidization promoting agent are known, and any of these methods can be used. A chemical curing method may be used from the view point that the obtained film has a small coefficient of linear expansion, and high modulus of elasticity, and tends to have large birefringence index, and is not damaged under a tension during annealing of the film, and a carbon film having excellent quality is obtained. The chemical curing method is excellent also in the aspect of improvement in the thermal conductivity of the carbon film.

For the preparation of polyamic acid from acid dianhydride and diamine, a known method can be used, and normally, at least one kind of aromatic acid dianhydride and at least one kind of diamine are dissolved in an organic solvent, and the obtained solution of polyamic acid in organic solvent is stirred under a controlled temperature condition until polymerization between the acid dianhydride and the diamine completes. These polyamic acid solutions may be obtained normally in a concentration of 5 to 35 wt %, or in a concentration of 10 to 30 wt %. When the concentration falls within this range, an appropriate molecular weight and solution viscosity can be obtained.

In one or more embodiments of the present invention, the acid dianhydride and diamine in the raw material solution may be substantially equivalent molar amounts, and the molar ratio may be, for example, 1.5:1 to 1:1.5, or 1.2:1 to 1:1.2, or 1.1:1 to 1:1.1.

The thickness of the carbon film for use in one or more embodiments of the present invention falls within the range of 10 μm to 150 μm, and in order to obtain carbon films satisfying such a range, the thickness of the polymer film as a raw material may be in the range of 25 μm to 200 μm. This is because the thickness of the finally obtained carbon film generally depends on the thickness of the starting polymer film. Therefore, in order to finally obtain a carbon film as described herein, having a thickness of 10 μm to 150 μm, the thickness of the starting polymer film may be within the range of 25 μm to 200 μm.

The polymer film can be produced from the polymer raw material or the synthetic material thereof by various known techniques. For example, the polyimide film is produced by casting a solution of polyamic acid which is the aforementioned polyimide precursor in an organic solvent, on a support such as an endless belt or a stainless drum, and drying to allow imidization. Specifically, the production process of the film by chemical curing is as follows. First, in the aforementioned polyamic acid solution, not less than a stoichiometric quantity of a dehydrating agent, and a catalytic amount of an imidization promoting agent are added, and the solution is casted or applied on a support plate or an organic film of PET or the like, or a support such as a drum or an endless belt, to give a film form, and the organic solvent is evaporated to give a film having self-supportability. Subsequently, the film is imidized while it is further heated and dried to obtain a polyimide film. The temperature in heating may be in the range of 150° C. to 550° C. Further, the production process of the polyimide may include the step of fixing or elongating the film so as to prevent it from contracting. This is based on the fact that conversion into the carbon film proceeds more easily by using a film in which molecular structure and its high order structure are controlled. That is, in order to make the graphitization reaction proceed smoothly, it is necessary to rearrange the carbon molecules in the graphite precursor. It is supposed that conversion to graphite is easy to proceed even at low temperature because only minimum rearrangement is required in polyimide having excellent orientation.

<Carbonization (Primary Heat Treatment), Secondary Heat Treatment>

Next, the technique of carbonization (primary heat treatment) and secondary heat treatment of the polymer film typified by polyimide will be described. In one or more embodiments of the present invention, a polymer film as a raw material is preheated in an inert gas to be carbonized (primary heat treatment). As the inert gas, nitrogen, argon or a mixed gas of argon and nitrogen may be used. The preheating is generally conducted at about 1000° C. The heating rate to the preheating temperature is not particularly limited, but can be, for example, 5 to 15° C./minute. In the preheating stage, it is effective to apply a pressure in the vertical direction on a film surface to such an extent that breakage of the film does not occur so as to prevent the orientation of the starting polymer film from being lost.

The film that is carbonized by the method as described above is set in a high temperature furnace, and a secondary heat treatment for making carbon atoms be oriented in a high order is conducted. The carbonized film may be set in such a manner that it is sandwiched between CIP materials or glassy carbon substrates. The charge stripping film as described herein can be obtained by further conducting a secondary heat treatment of the carbonized film at not less than 2400° C. in the same inert gas as that in the preheating. In particular, by heating at a high temperature of not less than 2600° C., the carbonized film is graphitized. In order to produce such a high temperature, generally, a current is directly applied to a graphite heater, and heating is conducted by utilizing the Joule heat. While the secondary heat treatment is conducted in an inert gas, argon is most appropriate as an inert gas, and a small amount of helium may be added to argon. The higher the treatment temperature is, the higher quality of graphite is obtained by conversion. By the thermal decomposition and the carbonization by the preheating, the area contracts by about 10 to 40% compared with the original polyimide film, and contrarily in the process of the secondary heat treatment, the area often expands by about 10%. By such contraction and expansion, internal stress arises in the charge stripping film, and strain arises inside the charge stripping film. Such strain or internal stress is reduced by treating at not less than 2900° C., and the layer of the graphite is arranged regularly, and further the thermal conductivity is increased. For obtaining the charge stripping film as described herein, 2200° C. is insufficient, and the treatment temperature may be not less than 2400° C., or not less than 2900° C., or not less than 3100° C. Of course, the treatment temperature can be the highest treatment temperature in the secondary heat treatment, and the obtained charge stripping film can be heat-treated again in the form of annealing. An excellent charge stripping film is obtained even when the treatment temperature is, for example, not more than 3700° C. (particularly, not more than 3600° C., or not more than 3500° C.). The heating rate from the preheating temperature to the heat treatment temperature can be, for example, 1 to 25° C./minute. The retention time at the treatment temperature is, for example, not less than 10 minutes, or may be not less than 30 minutes, and may be not less than 1 hour. An upper limit of the retention time is not particularly limited, but may be generally, not more than 5 hours, in particular, about not more than 3 hours.

The atmosphere in the high-temperature furnace at the time of the heat treatment may be pressurized, and in particular, when the secondary heat treatment is conducted at a temperature of not less than 2900° C. (or may be not less than 3000° C.), the atmosphere in the high-temperature furnace may be pressurized by the inert gas. When the heat treatment temperature is high, carbon starts sublimating from the film surface, and deterioration phenomena such as expansion of holes and cracks on the charge stripping film surface, and thinning may occur. However, by pressurization, such deterioration phenomena can be prevented, and an excellent charge stripping film can be obtained. The pressure (gauge pressure) of atmosphere in the high-temperature furnace by the inert gas is, for example, not less than 0.05 MPa, or may be not less than 0.10 MPa, or may be not less than 0.14 MPa. While the upper limit of the pressure of atmosphere is not particularly limited, it may be, for example, not more than 2 MPa, in particular, about not more than 1.8 MPa. In particular, when the secondary heat treatment is conducted at a temperature of not less than 2900° C., it may be possible to directly apply pressure on the charge stripping film in addition to pressurization of the inert gas, and the pressure can be applied, for example, at a pressure of 10 to 20 kg/cm$^2$. After the heat treatment, the temperature can be lowered at a rate of, for example, 30 to 50° C./minute.

According to the charge stripping film as described herein, for example, a uranium beam having a charge peak of 64+ can be converted to have a charge peak ranging from 81+ to 88+. According to the charge stripping film as described herein, it is possible to covert the charge so that the generation rate of peak charge state, relative to the total of generation rates of individual charge states of the beam after charge stripping is not less than 0.250 (or it may be not less than 0.260, the upper limit is, for example, not more than 0.350).

The present application claims the benefit of priority based on Japanese Patent Application No. 2015-083714 filed on Apr. 15, 2015. The entirety of description of Japanese Patent Application No. 2015-083714 filed on Apr. 15, 2015 is incorporated in the present application for reference.

EXAMPLES

Hereinafter, one or more embodiments of the present invention will be described more specifically by way of Examples. Of course, it goes without saying that the present invention is not limited by these Examples, and various forms can be made for the details.
(Physical Property Evaluation Method)
<Film Thickness>
The thickness of the charge stripping film as described herein, and the thickness of the polymer film which is a raw material include an error of about ±5 to 10%. Therefore, the film thicknesses of the charge stripping film and the polymer film were measured at different ten points in each sample, and the arithmetic mean value thereof was determined as the thickness of each sample.
<Density and Weight Per Unit Area>
By measuring the dimension, and the film thickness of the produced charge stripping film, the volume (cm$^3$) was calculated, and separately, the weight (g) of the charge stripping film was measured, and from the formula: density (g/cm$^3$)=weight (g)/volume (cm$^3$), the density of the charge stripping film was calculated. Also, from the dimension and the weight of the charge stripping film, weight per unit area (mg/cm$^2$)=weight (mg)/area (cm$^2$) was determined.
<Thermal Conductivity>
The thermal diffusivity of the charge stripping film was measured at 25° C., in vacuum (about 10$^{-2}$ Pa), at a frequency of 10 Hz using a thermal diffusivity measuring apparatus based on the periodic heating method ("LaserPit" apparatus, manufactured by ULVAC-RIKO, Inc.). In this measuring method, a thermocouple is attached at a point apart by a certain distance from a point irradiated with a laser beam to be heated, and the temperature change of the thermocouple is measured. The thermal conductivity (W/mK) was calculated by multiplying thermal diffusivity (m$^2$/s), density (kg/m$^3$), and specific heat (798 kJ/(kg·K)).
<Determination of Atomic Concentration of Carbon>
The atomic concentration of carbon of the produced carbon film was measured by using a scanning electron microscope (SEM) SU8000 manufactured by Hitachi High-Technologies Corporation, and a large-diameter SDD detector (EDX-XMax) manufactured by HORIBA, Ltd. The charge stripping film was analyzed at an accelerating voltage of 20 kV, and the atomic concentration of carbon was determined by atomic concentration of carbon (%) calculated after the analysis by attached software.

Production Example 1

A hardener comprising 20 g of acetic anhydride and 10 g of isoquinoline was mixed to 100 g of an 18 wt % DMF solution of a polyamic acid synthesized from pyromellitic acid anhydride and 4,4'-diaminodiphenyl ether in a proportion of 1/1 in terms of the mole ratio to be stirred, and after being centrifuged to be degassed, the liquid was cast and applied on aluminum foil. The process from stirring to defoaming was conducted at 0° C. After heating the resultant laminate of the aluminum foil and the polyamic acid solution for 150 seconds at 120° C., and respectively for 30 seconds at 300° C., 400° C., and 500° C., the aluminum foil was removed to produce polyimide films having different thicknesses. Regarding the thickness of the polyimide film, several kinds of films having different thicknesses ranging from 25 to 200 µm were produced by adjusting the casting speed.

Example 1

Four kinds of polyimide films with a thickness ranging from 25 to 200 µm were heated up to 1000° C. at a rate of 10° C./minute in nitrogen gas using an electric furnace, and they were retained at 1000° C. for 1 hour to conduct a pre-treatment. Then the obtained carbonized films were set inside a cylindrical carbon film heater, and heated to 2400° C. at a heating rate of 20° C./minute. After reaching to this temperature, the heater was turned off, and the films were cooled to room temperature, and thus charge stripping films 1 to 4 were produced. The treatment was conducted in an argon atmosphere under pressurizing at 0.1 MPa.

Example 2

Four kinds of polyimide films with a thickness ranging from 25 to 200 µm, the temperature were heated up to 1000° C. at a rate of 10° C./minute in nitrogen gas using an electric furnace, and they were retained at 1000° C. for 1 hour to conduct a pre-treatment. Then the obtained carbonized films were set inside a cylindrical carbon film heater, and heated to 2900° C. at a heating rate of 20° C./minute. At this temperature, the films were retained for 10 minutes under pressurizing at 15 kg/cm², and then the temperature was lowered at a rate of 40° C./minute, to produce charge stripping films 5 to 8. The treatment was conducted in an argon atmosphere under pressurizing at 0.1 MPa.

Example 3

A polyimide film with a thickness of 50 μm was heated up to 1000° C. at a rate of 10° C./minute in nitrogen gas using an electric furnace, and the film was retained at 1000° C. for 1 hour to conduct a pre-treatment. Then the obtained carbonized film was set inside a cylindrical carbon film heater, and heated to 2900° C. at a heating rate of 20° C./minute, and retained for 10 minutes, and then the temperature was lowered at a rate of 40° C./minute, to produce a charge stripping film 9. The treatment was conducted in an argon atmosphere under pressurizing at 0.1 MPa.

Example 4

The carbon film of No. 9 produced in Example 3 was cut into a disc having a diameter of 110 mm, and two of this film were laminated to fabricate a charge stripping film 10.

(Comparative Example 1) to (Comparative Example 5)

Comparative Example 1 is a carbon film (No. 11) with a thickness of 10 μm produced by vapor deposition, and had a weight per area of 2.0 mg/cm². Comparative Example 2 is a carbon film (No. 12) with a thickness of 20 μm produced by vapor deposition, and had a weight per area of 4.0 mg/cm².

Comparative Example 3 is a polished grassy carbon disc (No. 13) with a thickness of 85 μm, and the disc had a weight per area of 16.1 mg/cm².

Comparative Example 4 is a carbon film (No. 14) of 4.93 mg/cm² purchased from Arizona Carbon Foil Co., Inc. in the US.

Comparative Example 5 is a polished beryllium disc (Be) with a thickness of 85 μm, and the disc had a weight per area of 16.1 mg/cm².

The film thickness (μm), weight per unit area (mg/cm²), density (g/cm³), thermal conductivity (W/mK), and atomic concentration of carbon (%) of the obtained charge stripping film are shown in Table 1. For the mark * in Comparative Examples 3 to 5, a value in a catalogue is described. Any of the charge stripping films of Nos. 1 to 10 shown in Table 1 showed a density of not less than 0.90 g/cm³, a weight per unit area of not less than 2.0 mg/cm², a thermal conductivity of not less than 20 W/mK (in particular, not less than 45 W/mK), an atomic concentration of carbon of not less than 99%, and these were owing to the heat treatment at not less than 2400° C. for, for example, not less than 10 minutes.

TABLE 1

|  | Charge Stripping Film No. | Thickness (μm) | Weight per Unit Area (mg/cm²) | Density (g/cm³) | Thermal Conductivity (W/mK) | Atomic Concentration of Carbon (%) |
| --- | --- | --- | --- | --- | --- | --- |
| Example 1 | 1 | 14.3 | 2.3 | 1.63 | 45 | >99 |
|  | 2 | 20.0 | 3.7 | 1.47 | 50 | >99 |
|  | 3 | 46.1 | 6.8 | 1.23 | 55 | >99 |
|  | 4 | 126.7 | 11.6 | 1.62 | 220 | >99 |
| Example 2 | 5 | 14.1 | 2.3 | 1.61 | 1800 | >99 |
|  | 6 | 23.8 | 3.5 | 1.85 | 1750 | >99 |
|  | 7 | 56.7 | 7.0 | 1.48 | 1400 | >99 |
|  | 8 | 73.0 | 11.8 | 0.92 | 1200 | >99 |
| Example 3 | 9 | 35.2 | 7.1 | 2.22 | 1700 | >99 |
| Example 4 | 10 | 70.4 | 14.2 | 2.22 | 1700 | >99 |
| Comparative Example 1 | 11 | 10 | 2.0 | about 2 |  | >99 |
| Comparative Example 2 | 12 | 20 | 4.0 | about 2 |  | >99 |
| Comparative Example 3 | 13 | 85 | 16.1 | *1.93 | *58 | *>99 |
| Comparative Example 4 | 14 |  | 4.93 | *0.8-1.2 |  |  |
| Comparative Example 5 | Be | 85 | 16.1 | *1.85 | *200 | — |

<Fabrication of Stationary Type Charge Stripping Film for Uranium Beam>

Stationary type charge stripping films for an uranium ion beam in which an exposed part of the charge stripping film is 2.8 cm long and 1.4 cm wide were fabricated by charge stripping films of Nos. 1 to 9 in Table 1 sandwiched between the copper frames, and charge stripping films of Nos. 11, 12, and 14 sandwiched between aluminum frames, and by using beryllium as in the form of a disc (see FIG. 2). Any of the charge stripping films as described herein Nos. 1 to 9 could be cut by scissors or a cutter knife, and did not break by handling with a hand, and the films had excellent both working and handling ability.

<Evaluation 1 of Charge Stripping Rate of Uranium Beam by Charge Stripping Film>

Evaluation of a charge stripping film was conducted using an uranium beam which is a 50 MeV/u DC beam of U (uranium)$^{64+}$ a beam current of 200 to 300 enA, a beam diameter of 4 to 5 mm and produced by the accelerator at Nishina Center for Accelerator-Based Science, RIKEN, Japan. The mechanism of charge stripping in the employed uranium beam accelerator is as illustrated in the above FIG. 1. The stationary type charge stripping film for uranium beam fabricated by using one of the charge stripping films Nos. 1 to 8 in Table 1 was individually placed at the position of 10a in FIG. 1 (a rotary type charge stripping film is not placed at the position of 10b), and generation rates of ions of various charge states of the uranium beam after the $U^{64+}$ beam had passed through the charge stripping films were measured. The results are shown in FIG. 4.

FIG. 4 reveals that any of the charge stripping films Nos. 1 to 8 can convert the charge states sufficiently. It is also revealed that the charge states of the obtained ion can be controlled by controlling the weight per unit area, and that the beams having passed through the charge stripping films of Nos. 1 to 8 show adequately narrow distribution width of valence and sufficiently high intensity of occurrence of ions at the peak. Therefore, by controlling the weight per unit area, it is possible to sufficiently obtain ions of a desired charge state. For the same weight per unit area, there is no significant difference between the treatment temperatures of 2400° C. and 2900° C. However, the crystallinity, thermal conductivity, density and the like tend to be higher in conducting the treatment at 2900° C. than at 2400° C., the former case can be superior in the durability when more intense beam is radiated, or in the long-term durability.

<Evaluation 2 of Charge Stripping Rate for Uranium Beam by Charge Stripping Film>

In the same manner as in the above "Evaluation 1 of charge stripping rate for uranium beam by charge stripping film", for stationary type charge stripping films fabricated by using one of charge stripping films shown in Nos. 1 to 4, and 9 in Table 1, and stationary type charge stripping films fabricated by using other charge stripping films of Nos. 11, 12, and 14, generation rates of ions of various valences in the uranium beam after the $U^{64+}$ beam had passed through the films were measured. The results are shown in FIG. 5. In the charge stripping films shown in Nos. 1 to 4, and 9 in Table 1, the generation proportion of the charge state showing the highest generation rate is higher than the charge stripping films (Nos. 11, 12) produced by vapor deposition, and the film (No. 14) which is manufactured by Arizona Carbon Foil Co., Inc. and has an equivalent weight per unit area to that of films shown in Nos. 1 to 4, and 9. For example, the charge stripping film of No. 2 in Table 1 (3.7 mg/cm$^2$), and the charge stripping film manufactured by Arizona Carbon Foil Co., Inc. (No. 14, 4.9 mg/cm$^2$) show equivalent levels. This indicates that the charge stripping film of No. 2 in Table 1 can be a film having less carbon atom per unit area (thin charge stripping film) when the same charge state of ion beam is required. The generation rate in FIGS. 4 and 5 means the generation proportion of ions of each valence, relative to the total amount of the generated ions as 1 for each No.

<Evaluation of Uranium Beam Convergence after Passing Through Rotary Type Charge Stripping Film>

The charge stripping film of No. 10 fabricated in Example 4 was sandwiched in an aluminum disc-like holder shown in FIG. 3 to give a rotary type charge stripping film for a uranium beam shown in FIG. 6. The rotary type charge stripping film was rotated at 500 rpm around the center of the disc, and showed excellent strength without any breakage like tearing.

Similarly, for the carbon film of No. 13 and beryllium (Comparative Example 5), a rotary type charge stripping film was fabricated, and set at the position 10b in FIG. 1, and a DC beam of U (uranium)$^{64+}$ having an energy of 50 MeV/u, a beam current of 200 to 300 enA, a beam diameter of 4 to 5 mm passed through the rotary type charge stripping film while the film was rotated at 300 rpm. The relation between the ion valence and the generation rate after passage is shown in FIG. 7. The carbon film of No. 10 shows excellent charge stripping characteristics even when it is formed into a rotary type charge stripping film. This reveals that the distribution width of valences of the beam is narrow, and the intensity of occurrence of ions of a desired valence is sufficiently high. The carbon film of No. 10 is superior to the charge stripping film of No. 13 (85 μm glassy carbon disc) in the conversion efficiency, and shows the equivalent result with the beryllium disc of 85 μm. Also, as will be described later, the charge stripping film of No. 10 is superior to beryllium in terms of the heat resistance against a beam irradiation.

Convergence of a beam was evaluated at the positions 13a, 13b in FIG. 1. For evaluation of convergence of a beam, an apparatus called a profile monitor was used in which a beam is cut in round slices and scanned with tantalum wires. The relation between the position of the wire with which the beam came into contact, and the current was described as a graph, the convergence can be evaluated by comparing the graphs. The scanning by the wire sensor was conducted in three directions: a vertical direction, a horizontal direction, and a 45-degree oblique direction. $U^{86+}$ beams after passing through the beryllium disc (Comparative Example 5), the charge stripping film of No. 13, and the charge stripping film of No. 10 are measured by the profile monitor at the position 13a located directly downstream the vacuum box of the bending magnet, and a profile monitor at the position 13b after the converging electromagnet. Since the setting value of the converging electromagnet on the downstream side of the bending magnet is fixed to a certain setting value, it is determined that a narrower width of the graph at 13b indicates better convergence. When the charge stripping film of No. 9 was used, the widths of peaks indicated in the vertical direction, the horizontal direction, and the 45-degree oblique direction, which were detected at each of the positions 13a, 13b, were narrower or substantially equivalent, as compared with the cases of the beryllium disc (Comparative Example 5) and the charge stripping film of No. 13. This means that a beam having excellent convergence is obtained. The $U^{86+}$ beam is further accelerated downstream the position 13b by a ring cyclotron accelerator IRC. The $U^{86+}$ beam after passing through the charge stripping film of No. 10 is proved to be a $U^{86+}$ beam of high quality because it satisfactorily rounds outer part of the ring cyclotron accelerator IRC.

<Evaluation of Beam Durability of Rotary Type Charge Stripping Film>

When a rotary type charge stripping device attached with a beryllium disc is set to the accelerator as described above, and irradiated with a beam, the maximum beam current value was 12 eμA for $U^{64+}$, and as the beam current value was increased from about 10 eμA, the temperature of the beryllium disc (melting point 1287° C.) elevated and the disc was deformed by the heat. Therefore, during the operation of the beryllium disc, it was necessary to control the beam current value under 8 eμA.

On the other hand, when the charge stripping film of No. 10 was used, deformation of the film or light emission by heating were not observed even at a beam current value of 13 eμA. Further, 24-hours or longer continuous operation at a beam current value of not less than 1.5 times that in the case of using the beryllium disc was possible, and the operation at a maximum current value of 13 eμA in the accelerator became possible.

DESCRIPTION OF REFERENCE SIGNS

10a, 10b charge stripping film
11a, 11b electromagnet for converging beam 12 bending magnet
13a, 13b beam profile detector
14 incident ion beam
20 stationary type charge stripping film
21 charge stripping film
22 holder for stationary type charge stripping film
30 rotary type charge stripping film
31 substrate for fixing charge stripping film
32 substrate for supporting charge stripping film
33 charge stripping film
34 substrate for fixing charge stripping film Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. A charge stripping film for a charge stripping device of ion beam, wherein
    the charge stripping film is a carbon film produced by annealing a polymer film, and
    the charge stripping film has a film thickness of 10 µm to 150 µm, an area of at least 4 cm$^2$, and an atomic concentration of carbon of at least 97%.

2. The charge stripping film according to claim 1, wherein the charge stripping film has a density of 0.90 g/cm$^3$ to 2.26 g/cm$^3$.

3. The charge stripping film according to claim 1, wherein the charge stripping film has a weight per unit area of 1.5 mg/cm$^2$ to 30 mg/cm$^2$.

4. The charge stripping film according to claim 1,
    wherein the carbon film is produced by annealing the polymer film at a temperature of at least 2400° C. in an inert gas atmosphere, and
    wherein the polymer film comprises at least one selected from the group consisting of polyamide, polyimide, polyquinoxaline, polyparaphenylene vinylene, polyoxadiazole, polybenzimidazole, polybenzoxazole, polybenzothiazole, polyquinazolinedione, polybenzoxazinone, polyquinazolone, benzimidazobenzophenanthroline ladder polymer, and derivatives thereof.

5. The charge stripping film according to claim 4, wherein the polymer film comprises aromatic polyimide.

6. The charge stripping film according to claim 4, wherein the carbon film is produced by annealing the polymer film at a temperature of at least 2900° C. in an inert gas atmosphere.

7. A charge stripping laminate film for a charge stripping device of ion beam, comprising a laminate of a plurality of the charge stripping films according to claim 1.

8. A charge stripping laminate film for a charge stripping device of ion beam, comprising a laminate of the charge stripping film according to claim 1 and a charge stripping film produced by a method other than a polymer annealing method.

9. A charge stripping laminate film for a charge stripping device of ion beam, comprising a laminate of at least one layer of metal and metal oxide and the charge stripping film according to claim 1.

10. The charge stripping laminate film according to claim 9, wherein the laminate further comprises a graphite layer having different orientation.

11. The charge stripping film according to claim 1, wherein the charge stripping film has a density of 1.50 g/cm$^3$ to 2.26 g/cm$^3$.

12. A charge stripping film for a charge stripping device of ion beam, wherein
    the charge stripping film is a carbon film having a thermal conductivity in a film surface direction at 25° C. of at least 300 W/mK, and
    the charge stripping film has a film thickness of 10 µm to 150 µm, an area of at least 4 cm$^2$, and an atomic concentration of carbon of at least 97%.

13. The charge stripping film according to claim 12, wherein the charge stripping film has a density of 0.90 g/cm$^3$ to 2.26 g/cm$^3$.

14. The charge stripping film according to claim 12, wherein the charge stripping film has a density of 1.50 g/cm$^3$ to 2.26 g/cm$^3$.

15. The charge stripping film according to claim 12, wherein the charge stripping film has a weight per unit area of 1.5 mg/cm$^2$ to 30 mg/cm$^2$.

16. A charge stripping laminate film for a charge stripping device of ion beam, comprising a laminate of a plurality of the charge stripping films according to claim 12.

17. A charge stripping laminate film for a charge stripping device of ion beam, comprising a laminate of the charge stripping film according to claim 12 and a charge stripping film produced by a method other than a polymer annealing method.

18. A charge stripping laminate film for a charge stripping device of ion beam, comprising a laminate of at least one layer of metal and metal oxide and the charge stripping film according to claim 12.

19. The charge stripping laminate film according to claim 18, wherein the laminate further comprises a graphite layer having different orientation.

* * * * *